United States Patent
Kiyosawa et al.

[19]

[11] Patent Number: 6,082,222
[45] Date of Patent: Jul. 4, 2000

[54] RIGID INTERNAL GEAR OF A WAVE GEAR DRIVE

[75] Inventors: Yoshihide Kiyosawa; Hideo Yasue, both of Nagano-ken, Japan

[73] Assignee: Harmonic Drive Systems, Inc., Tokyo, Japan

[21] Appl. No.: 08/958,192

[22] Filed: Oct. 27, 1997

[51] Int. Cl.[7] .................................................. F16H 33/00
[52] U.S. Cl. ............................ 74/640; 74/457; 74/460; 74/462; 29/527.5; 29/525; 228/76.1; 219/76.1
[58] Field of Search .............................. 74/640.457, 460, 74/462; 29/527.5, 525; 219/76.1

[56] References Cited

U.S. PATENT DOCUMENTS

| | | | |
|---|---|---|---|
| 4,625,582 | 12/1986 | Kiryu | 74/640 |
| 4,715,247 | 12/1987 | Honda et al. | 74/640 |
| 4,825,720 | 5/1989 | Capdepuy | 74/640 |
| 4,840,090 | 6/1989 | Iwata | 74/640 X |
| 4,909,098 | 3/1990 | Kiryu | 74/640 |
| 5,485,766 | 1/1996 | Ishikawa | 74/640 |
| 5,715,732 | 2/1998 | Takizawa et al. | 475/180 X |

*Primary Examiner*—Dirk Wright
*Attorney, Agent, or Firm*—Burns, Doane, Swecker & Mathis LLP

[57] ABSTRACT

A rigid internal gear of a wave gear drive is comprise by a tooth-formed member having inner teeth and a circular gear body member, these two members being integrally connected with each other. The tooth-formed member is made of ferrous or copper material having a high strength and wear resistance, while the gear body member is made of lightweight material such as aluminum alloy and the like. These members are connected integrally with each other in a manner that one of these members is formed with baffle means and the other member is made by enveloped casting, or that the member having baffle means is pressed into the other member. These members are therefore surely connected with each other, so that a high torque can be transferred between these members. Also, the lightweight of the rigid internal gear can be achieved without deteriorating strength, wear resistance or the like thereof.

27 Claims, 1 Drawing Sheet

RIGID INTERNAL GEAR OF A WAVE GEAR DRIVE

BACKGROUND OF THE INVENTION

1. Field of the Invention

This invention relates to a rigid internal gear of a wave gear drive, and in particular to a rigid internal gear which is lightweight without deteriorating strength, wear resistance and the like thereof.

2. Related Art Description

A typical wave gear drive has a circular rigid internal gear, a cup-shaped flexible external gear disposed inside the rigid internal gear, and a wave generator fixedly inserted into the flexible external gear. The wave generator is generally shaped to have an elliptical profile, which deforms the flexible external gear into an elliptical shape so as to engage external teeth partially with internal teeth of the rigid internal gear. Rotation of the wave generator by a motor or the like causes to move the engaging portions of the teeth in the circumferential direction. Since there is a difference in number of teeth between the external and internal gears, relative rotation between the both gears occurs according to the difference in number of teeth. Thus, by fixing one of the gears, reduced rotational output can be obtained from the other gear.

The wave gear drive is characterized in that it has a small number of component parts and is lightweight in comparison with reduction mechanisms of other types. In order to realize more lightweight wave gear drive, the rigid internal gear as one of component parts thereof must be lightweight. More specifically, since the rigid internal gear requires a desired strength and wear resistance, it is typically made of ferrous or copper material. This means that the rigid internal gear occupies the most part of weight of the wave gear drive. In particular, where the rigid internal gear is formed integrally with a flange or housing for mounting the wave gear drive on the side of a motor or an output-side member, the rigid internal gear is extremely heavy. This type of rigid internal gear becomes an obstacle to achieving the lightweight of the wave gear drive, which is not preferable.

SUMMARY

An object of the present invention is to provide a wave gear drive having a rigid internal gear, which is able to achieve the lightweight of the wave gear drive without deteriorating strength and wear resistance of the rigid internal gear.

In order to realize the above object, a rigid internal gear of a wave gear drive according to the present invention is made as a composite structure wherein only a tooth-formed member having internal teeth that requires a desired strength and wear resistance is made of ferrous or copper material which has a high strength and wear resistance, a gear body member other than the tooth-formed member is made of lightweight material such as aluminum alloy, and the tooth-formed member and the gear body member are integrally connected with each other.

DETAILED DESCRIPTION OF A PREFERRED EMBODIMENT

Figure 1:
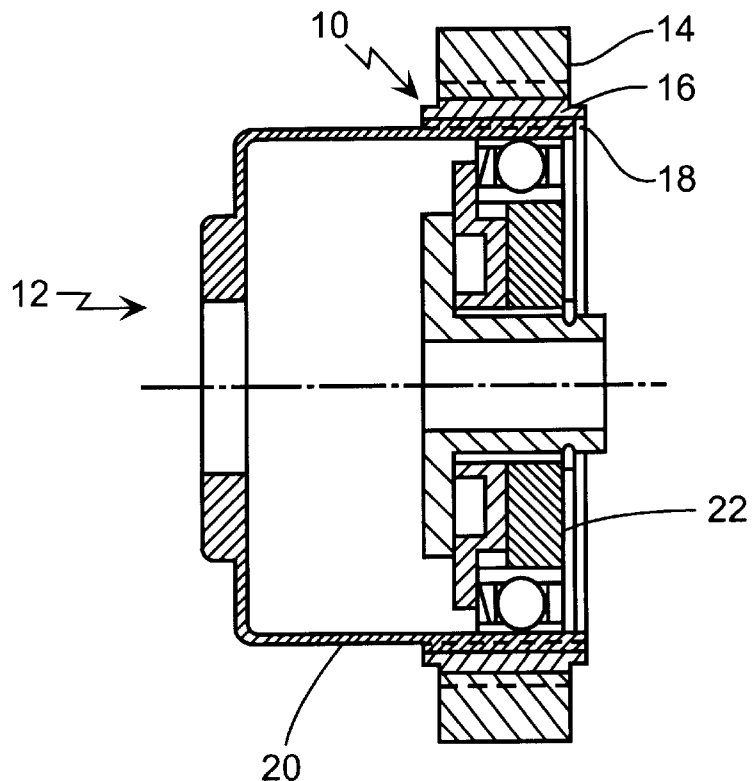
FIG. 1 is a cross-sectional view of a wave gear drive of the present invention taken along the longitudinal axis thereof.
Figure 2:
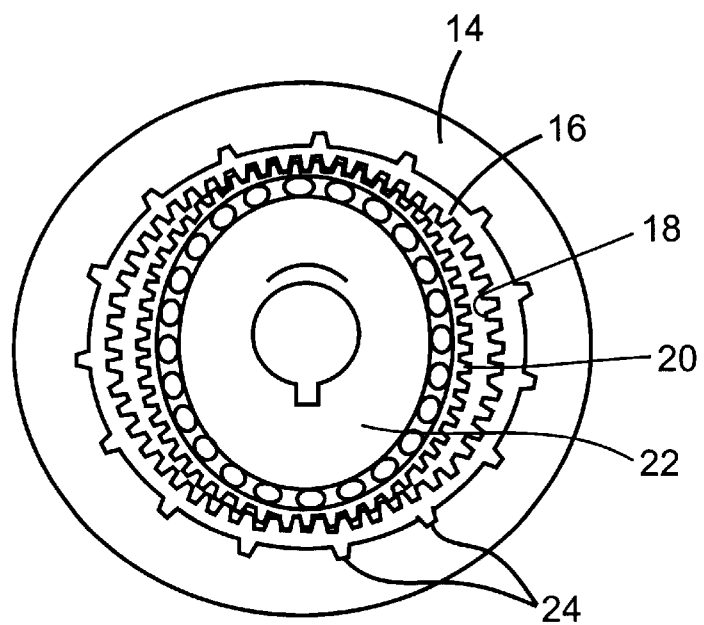
FIG. 2 is a view showing the various elements of the wave gear drive of FIG. 1.

A rigid internal gear 10 of a wave gear drive 12 according to the present invention will now be described in detail.

The rigid internal gear 10 of the present invention is, for example, composed of a circular gear body member 14 and a tooth-formed member 16 having internal teeth 18 on its inner circumferential surface. The gear body member 14 and tooth-formed member 16 are integrally connected with each other in a condition that the tooth-formed member is inserted into a circular inner circumferential surface of the gear body member.

In the composite rigid internal gear as constituted above, a connecting portion between the tooth-formed member and gear body member must be made so that it is capable of transferring high torque. The tooth-formed member may be fixedly connected to the gear body portion by means of fastening metal members such as fastening bolts and the like. However, if this kind of fastening method is adopted, the tooth-formed member and gear body member must be thick, which causes to prevent achieving the lightweight of the rigid internal gear. Further, since fastening members such as fastening bolts must be attached, the rigid internal gear becomes heavier by that amount.

Thus, according to a preferred embodiment of the present invention, in a wave gear drive 12 having a circular rigid internal gear 10, a circular flexible external gear 20, and a wave generator 22 for deforming the flexible external gear 20 radially to partially engage with the rigid internal gear 10 and for moving engaging portions in a circumferential direction; the rigid internal gear 10 is of a composite structure wherein a circular gear body member 14 made of lightweight material such as aluminum alloy or the like is integrally connected to a tooth-formed member 16 made of a heavy material having a high strength and wear resistance such as ferrous or copper material, and wherein the gear body member 14 and the tooth-formed member 16 are integrally connected with each other in the following manner.

Namely, the tooth-formed member 16 is formed on its outer circumferential surface or annular end surface with baffle means 24, and then the gear body member 14 is made by enveloped casting with the tooth-formed member 16 having baffle means 24 being inserted into a casting die for the gear body member, whereby these two members are integrally connected with each other. An uneven surface of the tooth-formed member such as casting surface thereof can be used as baffle means.

Alternatively, the tooth-formed member which is formed on its outer circumferential surface or annular end surface with baffle means may be pressed into the circular gear body member so that these two member are integrally connected. Spline and serration may also be employed as baffle means.

Further, one of the circular gear body member and tooth-formed member is pressed into the other member, a connecting portion between them is formed with a hole or holes for receiving pin members or key members, and thereafter the pin or key members are pressed into the holes to constitute baffle means between the gear body member and tooth-formed member so as to connect them integrally.

Furthermore, the gear body member and tooth-formed member may be integrally connected by means of welding.

In addition, one of the gear body member and tooth-formed member may be integrally formed on the other member by means of thermal spray.

These two members may be integrally connected by brazing.

While, it is preferable in terms of accuracy that gear cutting process for forming internal teeth on the tooth-formed member is carried out after the circular gear body member and tooth-formed member are integrally connected.

As described above, the rigid internal gear of the wave gear drive is comprised by the tooth-formed member having a high strength and wear resistance and the lightweight circular gear body member. Further, in the preferred embodiment, these two members are integrally connected in a manner that a high torque can be transferred between these members.

According to the present invention, the rigid internal gear which is lighter than conventional ones can be realized without deteriorating its torque transfer capacity, strength, wear resistance or the like. As a result, by employing the rigid internal gear of the present invention, a wave gear drive which is lighter than conventional ones can easily be realized.

In addition, according to the present invention, there is obtained the following effect. Namely, in operation of the wave gear drive, the wave generator positioned at an inner side thereof becomes high in temperature in comparison with the rigid internal gear positioned at an outer side thereof. As a result, the thermal expansion of the wave generator becomes larger than that of the rigid internal gear, whereby meshing between the rigid internal gear and the flexible external gear tends to be tight. According to the present invention, however, where the gear body member of the rigid internal gear is made of aluminum, since coefficient of thermal expansion of the gear body member is larger than that of the wave generator made of ferrous material, it is possible to suppress disadvantages due to the difference in temperature between the inner and outer sides of the wave gear drive such as tightening of meshing between the both gears and the like.

What is claimed is:

1. A wave gear drive, comprising:
    a circular rigid internal gear,
    a circular flexible external gear, and
    a wave generator for deforming the flexible external gear radially to engage partially with the rigid internal gear and for moving engaging portions of these gears in a circumferential direction,
    the rigid internal gear has a circular gear body member and a tooth-formed member formed on its inner circumferential surface with internal teeth, and the gear body member and the tooth-formed member are integrally connected with each other.

2. The wave gear according to claim 1, wherein the tooth-formed member is formed on its outer circumferential surface or annular end surface with baffle means, and wherein
    the gear body member is made by enveloped casting with the tooth-formed member being inserted into a casting die for the gear body member, whereby the gear body member and the tooth-formed member are integrally connected with each other.

3. The wave gear according to claim 1, wherein the tooth-formed member is formed on its outer circumferential surface or annular end surface with baffle means, and wherein
    the tooth-formed member is pressed into the gear body member, whereby the gear body member and the tooth-formed member are integrally connected with each other.

4. The wave gear according to claim 1, wherein one of the gear body member and the tooth-formed member is pressed into the other member, holes are formed in a connecting portion between these members for receiving engaging members such as pins, keys and the like, and thereafter the engaging members are pressed into the holes to constitute baffle means, whereby the gear body member and the tooth-formed member are integrally connected with each other.

5. The wave gear according to claim 1, wherein the gear body member and the tooth-formed member are welded to integrally connect with each other.

6. The wave gear according to claim 1, wherein one of the gear body member and the tooth-formed member is formed on the other member by means of thermal spraying, whereby the gear body member and the tooth-formed member are integrally connected with each other.

7. The wave gear according to claim 1, wherein the gear body member and the tooth-formed member are welded to integrally connect with each other.

8. The wave gear according to claim 1, wherein tooth cutting process for forming the internal teeth is carried out after the gear body member and the tooth-formed member are connected integrally with each other.

9. The wave gear according to claim 1, wherein the gear body member is made of a material having coefficient of thermal expansion which is larger than that of a material for the wave generator.

10. The wave gear according to claim 9, wherein the gear body member is made of aluminum.

11. The wave gear according to claim 1, wherein the circular gear body member is made of a first material and the tooth-formed member is made of a second material that is different than the first material.

12. The wave gear according to claim 11, wherein the first material is lighter than the second material.

13. The wave gear according to claim 11, wherein the first material includes aluminum.

14. The wave gear according to claim 12, wherein the first material includes aluminum.

15. The wave gear according to claim 11, wherein the second material is one of ferrous and copper.

16. The wave gear according to claim 11, wherein the second material is ferrous.

17. The wave gear according to claim 11, wherein the second material is copper.

18. The wave gear according to claim 12, wherein the second material is one of ferrous and copper.

19. The wave gear according to claim 13, wherein the second material is one of ferrous and copper.

20. The wave gear according to claim 12, wherein the second material is ferrous.

21. The wave gear according to claim 12, wherein the second material is copper.

22. A wave gear according to claim 11, wherein the gear body member and the tooth-formed member are welded to integrally connect with each other.

23. A wave gear according to claim 11, wherein one of the gear body member and the tooth-formed member is formed on the other member by means of thermal spraying, whereby the gear body member and the tooth-formed member are integrally connected with each other.

24. A wave gear according to claim 11, wherein the gear body member and the tooth-formed member are welded to integrally connect with each other.

25. A wave gear according to claim 11, wherein a tooth cutting process for forming the internal teeth is carried out after the gear body member and the tooth-formed member are connected integrally with each other.

26. A wave gear according to claim 11, wherein the gear body member is made of a material having coefficient of thermal expansion which is larger than that of a material for the wave generator.

27. A wave gear according to claim 26, wherein the gear body member is made of aluminum.

* * * * *